US012350701B2

(12) United States Patent
Beck

(10) Patent No.: US 12,350,701 B2
(45) Date of Patent: Jul. 8, 2025

(54) INJECTION GUN

(71) Applicant: SUMMIT LEED LLC, Akron, OH (US)

(72) Inventor: Daniel Charles Beck, Akron, OH (US)

(73) Assignee: SUMMIT LEED LLC, Akron, OH (US)

( * ) Notice: Subject to any disclaimer, the term of this patent is extended or adjusted under 35 U.S.C. 154(b) by 113 days.

(21) Appl. No.: 17/872,884

(22) Filed: Jul. 25, 2022

(65) Prior Publication Data

US 2024/0024914 A1 Jan. 25, 2024

(51) Int. Cl.
*B05C 17/005* (2006.01)
*E04G 23/02* (2006.01)

(52) U.S. Cl.
CPC ........ *B05C 17/005* (2013.01); *B05C 17/0052* (2013.01); *E04G 23/0211* (2013.01)

(58) Field of Classification Search
CPC .............. B05C 17/005; B05C 17/0052; E04G 23/0211; E04G 23/0203
See application file for complete search history.

(56) References Cited

U.S. PATENT DOCUMENTS 3,776,525 A * 12/1973 Warner ................. B29B 7/7404 52/742.16
2004/0079169 A1* 4/2004 Wild ........................ A01G 7/06 73/861
2009/0105411 A1* 4/2009 Erdem ............... C08G 18/7657 524/591
2022/0412109 A1* 12/2022 Lee ....................... B05B 7/0408

FOREIGN PATENT DOCUMENTS

JP 2012112503 A 6/2012
JP 2017074680 A 4/2017

* cited by examiner

*Primary Examiner* — Ishal Pancholi
*Assistant Examiner* — Robert K Nichols, II
(74) *Attorney, Agent, or Firm* — Mannava & Kang, P.C.

(57) ABSTRACT

An injection gun includes a filler material injection assembly. The filler material injection assembly includes a pressure regulator handle to control a flow of filler material, a four-way valve, a pressure gauge, a pressure release valve assembly, and a first output coupling. The four-way valve is connected to the pressure regulator handle. A first port of the four-way valve is connected to the pressure regulator handle to receive the filler material under pressure. The pressure gauge is connected to a second port of the four-way valve to indicate a level of pressure of the filler material under pressure. A pressure release valve assembly is connected to a third port of the four-way valve. The pressure release valve assembly reduces the level of pressure of the filler material under pressure. A first output coupling is connected to a fourth port of the four-way valve to eject the filler material under pressure.

14 Claims, 5 Drawing Sheets

INJECTION PORT
300

SOLID STRUCTURE
400

PLAN VIEW

PERSPECTIVE VIEW

INJECTION GUN

BACKGROUND

Solid structures, such as concrete walls, may form cracks or voids. Filler material may be used to fill the cracks or voids. In some examples, manual pumps, such as hand pumps, may be used to pump the filler material into the cracks or voids in the solid structures.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the principles of the present disclosure are described by referring mainly to examples thereof. In the following description, numerous specific details are set forth in order to provide an understanding of the examples. It will be apparent, however, to one of ordinary skill in the art, that the examples may be practiced without limitation to these specific details. In some instances, well known methods and/or structures have not been described in detail so as not to unnecessarily obscure the description of the examples. Furthermore, the examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

Solid structures, such as concrete walls, may form cracks. In the present disclosure, a crack may refer to cracks, voids, or another type of imperfection formed in a solid structure. In order to restore integrity of the solid structures, the cracks may be filled with a filler material. In some instances, pumps may be used to inject the filler material into the cracks. A concern with such pumps for filling the cracks may be that the rate at which the filler material may be injected may be relatively low. For instance, in many cases manual pumps, such as hand pumps, are used to inject filler material. However, such manual pumps may be capable of injecting filler material at a relatively low rate, for instance, in a range of 8 to 10 linear feet per day.

Disclosed herein are apparatuses, systems, and methods that may enable efficient injection of filler material. In some examples, an injection gun may inject hydrophobic polyurethane materials, or other materials with similar or lower viscosity, to fill or flush cracks, wash out areas, holes, or other types of voids in concrete or other materials that can withstand the pressures. The injection gun may have a filler material injection assembly and a water injection assembly. The filler material injection assembly may include a pressure regulator handle, a four-way valve, a pressure gauge, and a pressure release valve assembly, which may include a ball valve and a collection tube. In some examples, the injection gun may be connected to a first airless pump to inject filler material and a second airless pump to inject water.

Figure 1A:
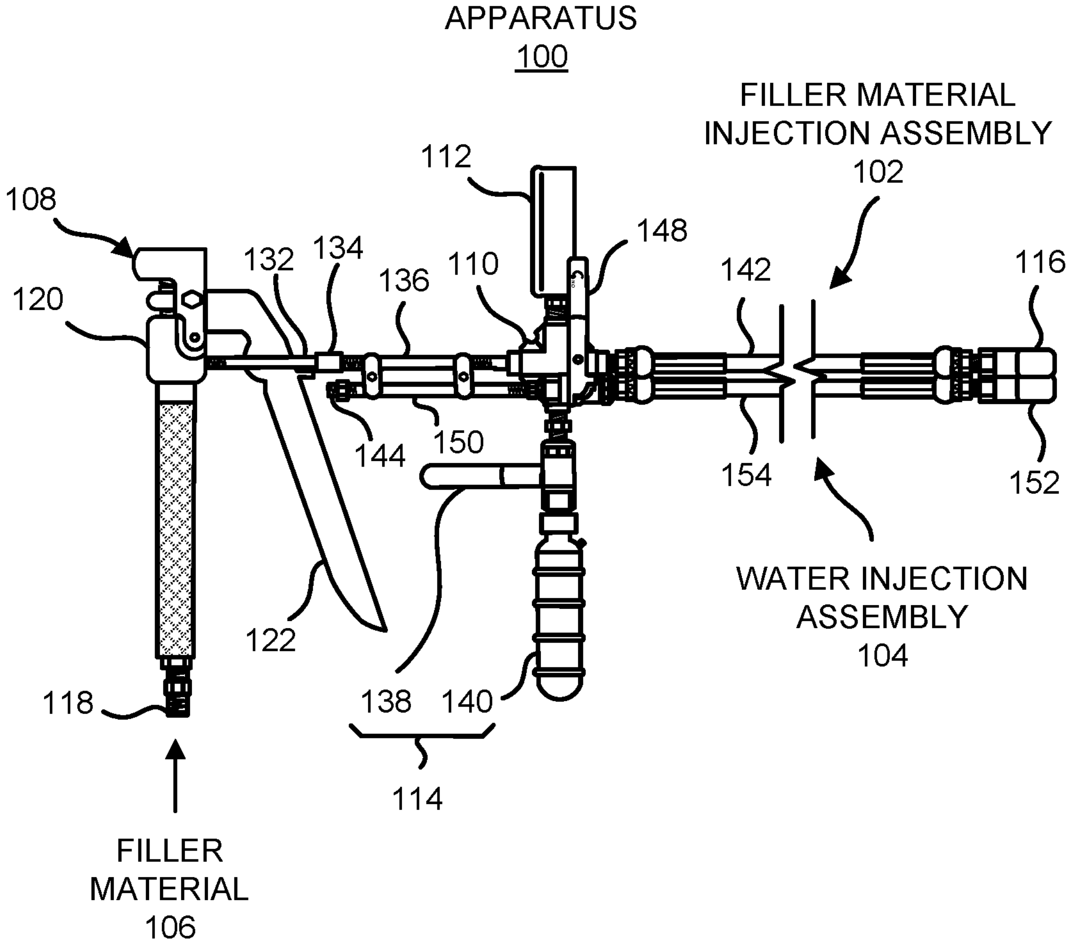
FIG. 1A shows a diagram of an example apparatus to eject filler material under pressure.

Reference is made to FIGS. 1A to 4B. FIG. 1A shows a diagram of an example apparatus 100 to eject filler material under pressure. FIG. 1B shows an exploded view of the example apparatus depicted in FIG. 1A, including an example filler material injection assembly 102 and an example water injection assembly 104.

Figure 1B:
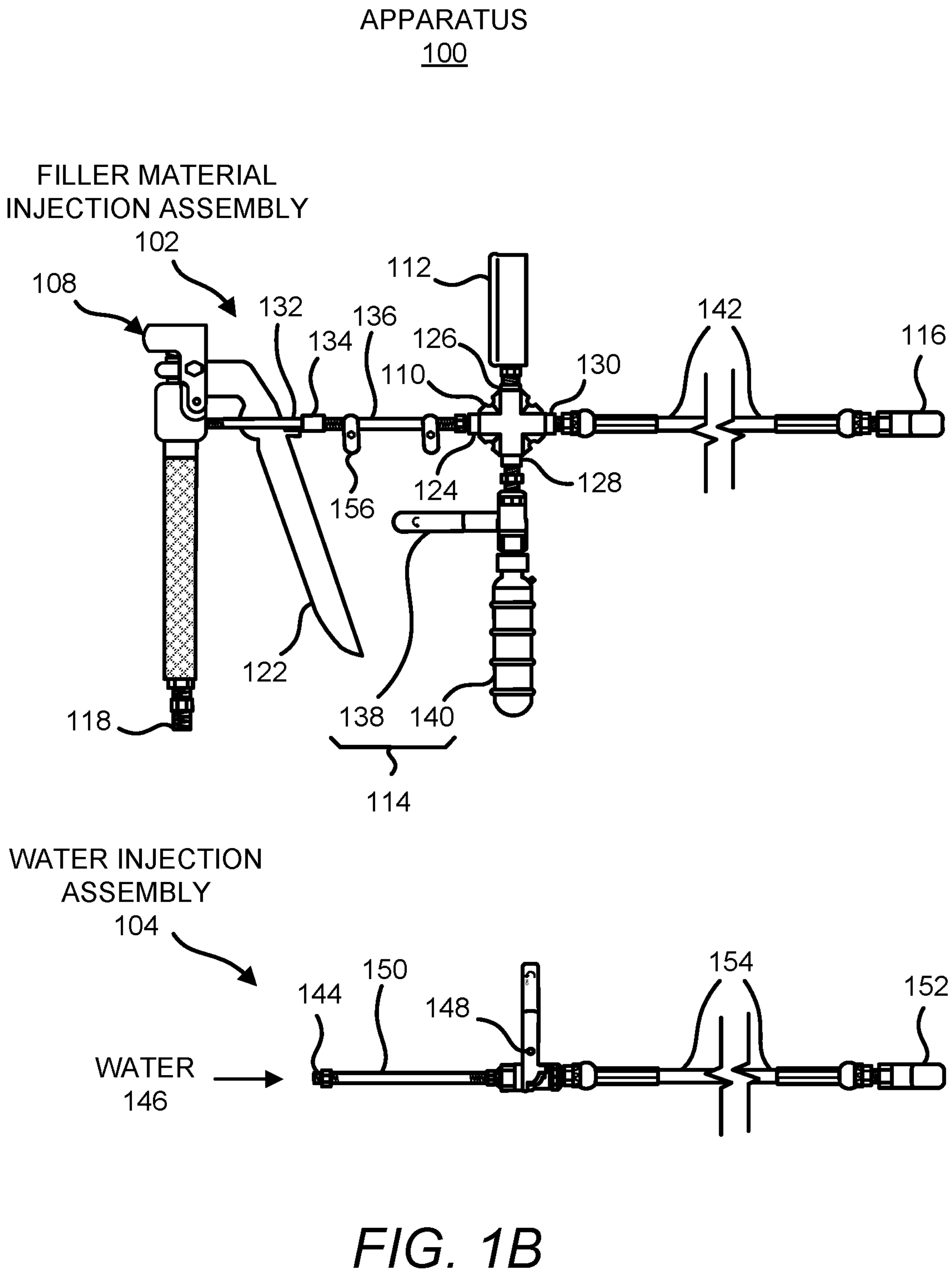
FIG. 1B shows an exploded view of the example apparatus depicted in FIG. 1A, including an example water injection assembly and an example filler material injection assembly.
Figure 2:
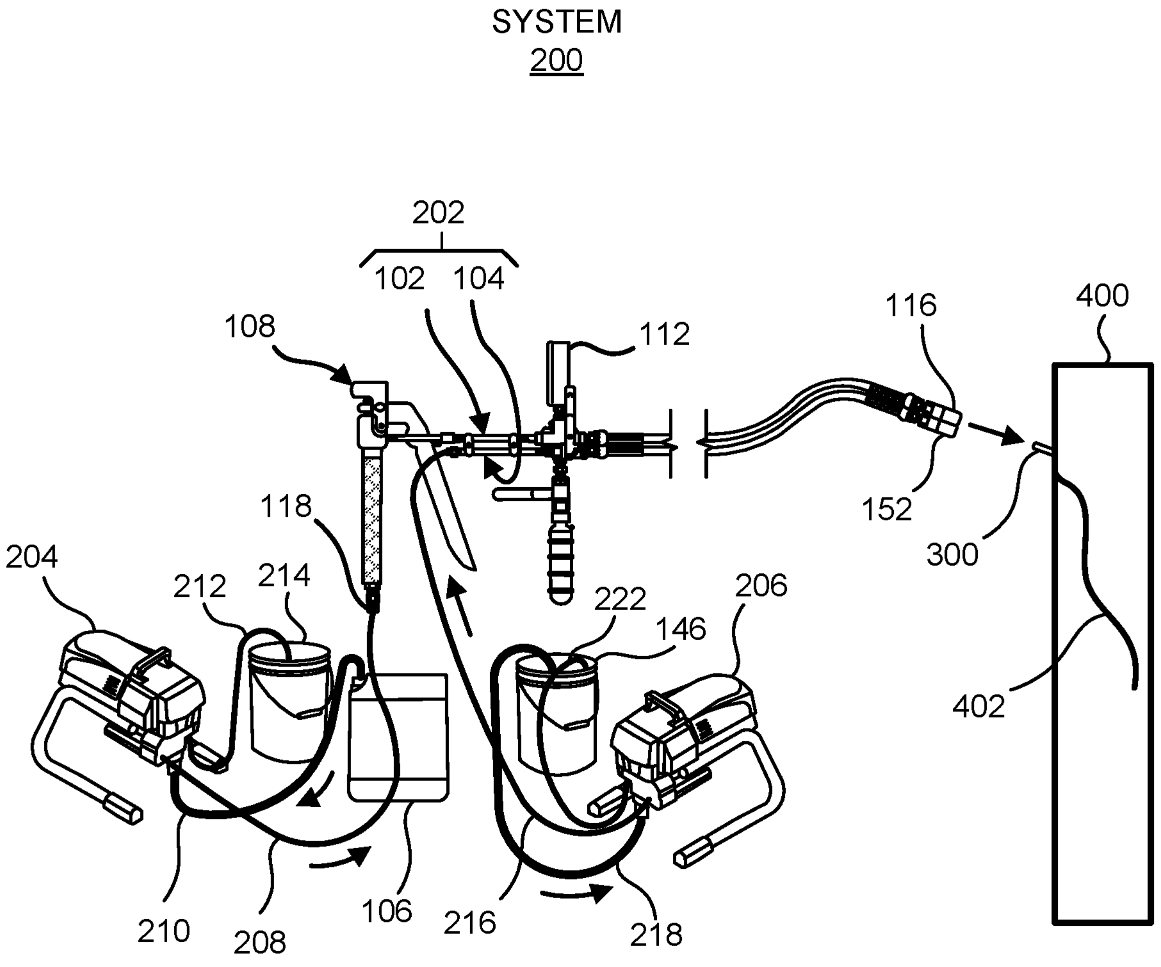
FIG. 2 shows a perspective view of an example system within which the apparatus depicted in FIG. 1A may be implemented.
Figure 3:
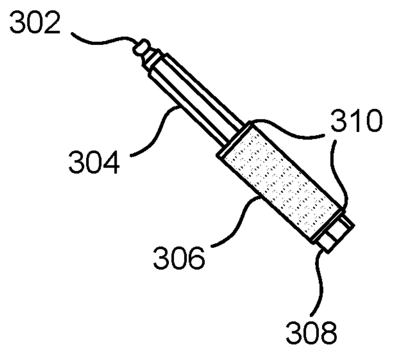
FIG. 3 shows a diagram of an example injection port to be coupled to the apparatus depicted in FIGS. 1A, 1B, and 2.
Figure 4A:
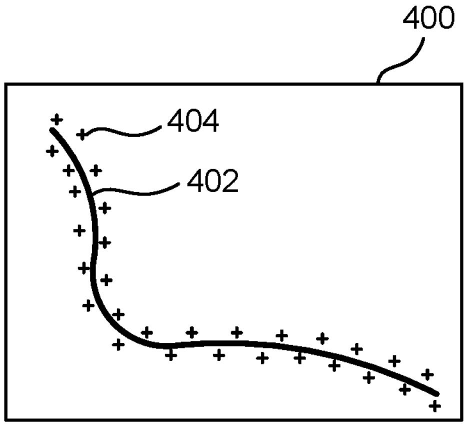
FIG. 4A shows a plan view of an example solid structure having a crack or void, in which the example injection port depicted in FIG. 3 may be installed.
Figure 4B:
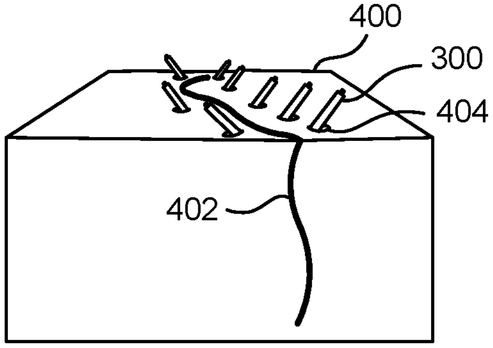
FIG. 4B shows a perspective view of an example solid structure having a crack or a void, and example injection ports depicted in FIG. 3 installed adjacent to the crack or the void.

FIG. 2 shows a perspective view of an example system 200 within which the apparatus 100 depicted in FIG. 1A may be implemented. FIG. 3 shows a diagram of an example injection port 300 to be coupled to the apparatus 100 depicted in FIGS. 1A, 1B, and 2. FIG. 4A shows a plan view of an example solid structure 400 having a crack or void 402, in which the example injection port 300 depicted in FIG. 3 may be installed. FIG. 4B shows a perspective view of the example solid structure 400 depicted in FIG. 4A, and example injection ports 300 depicted in FIG. 3 installed adjacent to the crack or the void 402.

It should be understood that the apparatus 100 depicted in FIGS. 1A and 1B, the system depicted in FIG. 2, the injection port depicted in FIG. 3, and the solid structure 400 depicted in FIGS. 4A and 4B may include additional features and that some of the features described herein may be removed and/or modified without departing from the scope of the example apparatus 100, the system 200, the injection port 300, and the solid structure 400.

FIGS. 1A and 1B show the apparatus 100 to eject a fluid under pressure. In the present disclosure, the apparatus 100 may be referred to as an injection gun 100. In some examples, the injection gun 100 may include a filler material injection assembly 102 and a water injection assembly 104.

The filler material injection assembly 102 may eject a filler material 106, which may include hydrophobic polyurethane materials having a predefined viscosity, or other materials with similar or lower viscosity. By way of particular example and for purposes of illustration, the filler material 106 may be a hydrophobic, expanding, polyurethane, chemical grout, or the like. The filler material 106 may be in liquid form, and may expand after being injected in to the crack 402, for instance, up to 30 times the liquid volume, or more. The filler material 106 may have a viscosity of up to 700 centipoise (CPS) at 74 degrees Fahrenheit, or more.

In some examples, the filler material injection assembly 102 may include a pressure regulator handle 108, a four-way valve 110, a pressure gauge 112, a pressure release valve assembly 114, and a first output coupling 116. The pressure regulator handle 108 may control a flow of the filler material 106. The filler material 106 may be received at an input port 118 at a predefined pressure. In some examples, a pump, such as the first airless pump 204 depicted in FIG. 2, may deliver the filler material 106 at the predefined pressure. The pressure regulator handle 108 may include a regulator valve 120 and a lever 122 coupled to the regulator valve 120 to control the flow of the filler material 106 through the filler material injection assembly 102.

The four-way valve 110 may include a first port 124, a second port 126, a third port 128, and a fourth port 130. The pressure regulator handle 108 may be connected to the first port 124 of the four-way valve 110. In some examples, the pressure regulator handle 108 may be connected to the first port 124 via a first tube 132, a first coupling 134, and a second tube 136. The first tube 132 may be connected between the pressure regulator handle 108 and the first coupling 134, and the second tube 136 may be connected between the first coupling 134 and the first port 124 of the four-way valve 110.

The first coupling 134 may have a predefined size or diameter relative to a size or diameter of the first tube 132 based on a predefined difference in the level of pressure between the first tube 132 and the first coupling 134. By way of particular example, a diameter of a flow passage in the filler material injection assembly 102 may increase from a diameter of the first tube 132 to a diameter of the second tube 136 by a predefined amount via the first coupling 134, for instance, from ⅜" to ¼". The first tube 132, the first coupling 134, and/or the second tube 136 may be formed of a metal, such as brass, or the like.

The pressure gauge 112 may be connected to the second port 126 of the four-way valve 110. The pressure gauge 112 may indicate a level of pressure of the filler material 106 under pressure. By way of particular example and for purposes of illustration, the pressure gauge 112 may measure pressures up to at least 3,000 pounds per square inch (PSI), and the operating pressure of the filler material 106 in the filler material injection assembly 102 may be about 2,500 PSI, or greater. In some implementations, the pressure gauge 112 may measure pressures up to at least 5,000 PSI, based on greater operating pressures of the filler material injection assembly 102. It should be understood that the levels of the operating pressure of the filler material injection assembly 102 and the pressure gauge 112 may be greater or lower than the particular levels described herein.

The pressure release valve assembly 114 may be connected to the third port 128 of the four-way valve 110. The pressure release valve assembly 114 may reduce the level of pressure of the filler material 106 under pressure in the filler material injection assembly 102, for instance, prior to disconnecting the first output coupling 116 from an injection port, such as the injection port 300 depicted in FIGS. 2, 3, and 4B. In some examples, the pressure release valve assembly 114 may include a flow control valve 138 connected to the third port 128 of the four-way valve 110 and a collection tube 140 connected to the flow control valve 138. In some examples, the flow control valve 138 may be a brass ball value. The collection tube 140 may have a predefined volume to catch the filler material 106 when the flow control valve 138 is opened to reduce the level of pressure of the filler material 106 in the filler material injection assembly 102. In some examples, the collection tube 140 may be formed of a flexible material, such as rubber, or the like. The collection tube 140 may be referred to as a rubber blow-out bladder.

The filler material injection assembly 102 may include a third tube 142 connected between the fourth port 130 of the four-way valve 110 and the first output coupling 116. The third tube 142 may be formed of a flexible material. In some examples, the third tube 142 may be formed of a rubber, a plastic, or a combination thereof. The third tube 142 may have a predefined length such that the third tube 142 may be routed around various types of obstacles or obstructions near the injection port 300. The third tube 142 may be formed of a chemical resistant material. The first output coupling 116 may be a mechanical fitting, such as a grease fitting or a grease coupling. In some examples, the first output coupling 116 may be a Zerk fitting, or the like.

The apparatus 100 may include a water injection assembly 104, which may be mounted to the filler material injection assembly 102. The water injection assembly 104 may include an input port 144 to receive water 146. The input port 144 may be connected to a pump, such as the second airless pump 206 depicted in FIG. 2, that may pump the water 146 into the input port 144. The water injection assembly 104 may include a flow control valve 148 connected to the input port 144 to control a flow of the water 146. A fourth tube 150 may be connected between the input port 144 and the flow control valve 148. The fourth tube 150 may be formed of a metal, such as brass, or the like.

The water injection assembly 104 may include a second output coupling 152 connected to the flow control valve 148 via a fifth tube 154. The fifth tube 154 may be formed of a flexible material. In some examples, the fifth tube 154 may be formed of a rubber, a plastic, or a combination thereof. The fifth tube 154 may have a predefined length such that fifth tube 154 may be routed around various types of obstacles or obstructions near the injection port 300. The fifth tube 154 may be formed of a chemical resistant material. The second output coupling 152 may be connected to the flow control valve 138 to eject the water 146. The second output coupling 152 may be a mechanical fitting, such as a grease fitting or a grease coupling. In some examples, the second output coupling 152 may be a Zerk fitting, or the like.

In some examples, the water injection assembly 104 may be mounted to the filler material injection assembly 102. The apparatus 100 may include a plurality of clamps 156 mounted to the second tube 136 of the filler material injection assembly 102. The plurality of clamps 156 may be connected to the fourth tube 150 of the water injection assembly 104 to mount the water injection assembly 104 to the filler material injection assembly 102. In some examples, the third tube 142 of the filler material injection assembly 102 and the fifth tube 154 of the water injection assembly 104 may be fixed together, for instance via a clamp, such as the clamps 154, when the water injection assembly 104 is mounted to the filler material injection assembly 102.

According to examples, a second pressure regulator handle, which may be the same as the pressure regulator handle 108, may be connected to the input port 144 of the water injection assembly 104 to control flow of the water 146 through the water injection assembly 104. In some examples, the pressure regulator handle 108 may be disconnected from the filler material injection assembly 102 and connected to the input port 144 of the water injection assembly 104. According to examples, the water injection assembly 104 may include a pressure gauge, such as the pressure gauge 112, to monitor a level of pressure in the water injection assembly 104 and a pressure release valve assembly, such as the pressure release valve assembly 114, to release the pressure in the water injection assembly 104.

Referring now to FIG. 2, the example system 200 may include an injection gun 202, a first airless pump 204 to pump the filler material 106 to the injection gun 202, and a second airless pump 206 to pump the water 146 to the injection gun 202. According to examples, the injection gun 202 may be the same as the apparatus 100 depicted in FIGS. 1A and 1B. The system 200 may include one or more than one of the injection port 300 disposed along a crack 402 formed in a solid structure 400 depicted in FIGS. 4A and 4B. The system 200 may be referred to herein as an airless injection gun system.

The first airless pump 204 and the second airless pump 206 may be airless pumps that may use a relatively high-pressure fluid supply for atomization without the use of compressed air. Airless pumps may pump relatively higher viscosity fluid, at relatively higher pressures, than pumps powered by compressed air or high volume low pressure (HVLP) pumps. According to examples, the first airless pump 204 may pump the filler material 106 to the injection gun 202 to be ejected through the first output coupling 116 at a relatively high pressure to fill the crack 402, which may increase the rate at which the crack 402 in the solid structure 400 may be filled.

In some examples, the injection gun 202 may include the filler material injection assembly 102 depicted in FIGS. 1A and 1B, including the pressure regulator handle 108 to control the flow of filler material 106, the pressure gauge 112 to indicate the level of pressure of the filler material 106, and the pressure release valve assembly 114 to reduce the level of pressure of the filler material 106 in the filler material injection assembly 102. In some examples, the injection gun 202 may include the water injection assembly 104, which may include the flow control valve 148 to control the flow of water 146 though the second output coupling 152.

In some examples, the first airless pump 204 may be connected to the pressure regulator handle 108 of the filler material injection assembly 102 to supply the filler material 106 to the filler material injection assembly 102. The first airless pump 204 may be connected to the input port 118 of the pressure regulator handle 108 via a first supply line 208. The first airless pump 204 may include a first supply tube 210 connected to a supply of the filler material 106 and a first priming tube 212 connected to a priming bucket 214 to prime the first airless pump 204. The first airless pump 204 may supply the filler material 106 under pressure to the filler material injection assembly 102.

In some examples, the second airless pump 206 may be connected to the input port 144 of the water injection assembly 104 via a second supply line 216. The second airless pump 206 may include a second supply tube 218 connected to a source of the water 146, such as a bucket. A second priming tube 222 may be connected to the water 146 to prime the second airless pump 206. The second airless pump 206 may supply the water 146 under pressure through the water injection assembly 104.

The filler material injection assembly 102 of the injection gun 202 may include the four-way valve 110 connected to the pressure regulator handle 108. The first port 124 of the four-way valve 110 may be connected to the pressure regulator handle 108 to receive the filler material 106 under pressure. The second port 126 of the four-way valve 110 may be connected to the pressure gauge 112, the third port 128 of the four-way valve 110 may be connected to the pressure release valve assembly 114, and the fourth port 130 of the four-way valve 110 may be connected to the first output coupling 116. The filler material 106 under pressure may be ejected through the first output coupling 116.

The filler material injection assembly 102 of the injection gun 202 may include the first tube 132 connected to the pressure regulator handle 108, the first coupling 134 connected to the first tube, and the second tube 136 connected between the first coupling 134 and the first port 124 of the four-way valve 110. The first coupling 134 may be a predefined size relative to a size of the first tube 132 based on a predefined difference in the level of pressure between the first tube 132 and the first coupling 134 and/or the second tube 136. The third tube 142 may be connected between the fourth port 130 of the four-way valve 110 and the first output coupling 116. The third tube 142 may be formed of a flexible material and may have a predefined length, which may enable the first output coupling 116 to be routed around certain obstacles.

According to examples, the system 200 may include the injection port 300, which may be mounted in the solid structure 400 adjacent to the crack 402. In some examples, the solid structure 400 may be formed of concrete, wood, metal, rubber, and/or the like. The injection port 300 may be inserted into the solid structure 400 to intersect the crack 402. In some examples, the injection port 300 may include a mechanical fitting, such as a grease fitting or grease coupling, to couple to the first output coupling 116 and the second output coupling 152.

As depicted in FIG. 3, the injection port 300 may include a coupling 302 to couple to the first output coupling 116. The injection port 300 may include a shaft 304, which may be an elongated nut for tightening the injection port 300. A gasket 306 may be provided between an end port 308 and the shaft 304. In some examples, the gasket 306 may be formed of a rubber, or the like. A washer 310 may be provided at each end of the gasket 306. The washer 310 may be a compression washer, or the like.

The injection port 300 may be inserted into the solid structure 400 to intersect the crack 402. As depicted in FIGS. 4A and 4B, a plurality of injection ports 300 may be installed at predefined port locations 404 along the crack 402. The number and positions of the injection ports 300 may be based on the size and the shape of the crack 402, and may be determined based on prior knowledge, experimentation, research, and/or the like. In some examples, the port locations 404 may be placed along the length of the crack 402, in a stitching pattern, at a predefined interval. By way of particular example and for purposes of illustration, the port locations 404 may be placed along the length of the crack 402 at 8 inch intervals.

According to examples, the first output coupling 116 may be coupled to one of the injection ports 300 to deliver the filler material 106 under pressure. The pressure of the filler material 106 through the injection gun 202 may be monitored via the pressure gauge 112. As the crack 402 is filled with the filler material 106, the first output coupling 116 may be moved down the line to a subsequent injection port 300.

According to examples, the injection gun 202 may include the pressure release valve assembly 114. In some instances, as the filler material 106 is under relatively high pressure, the removal of the first output coupling 116 from the injection port 300 may create a blow-back, or a sudden release of the relatively high pressure of the filler material 106. The pressure release valve assembly 114 may lower the pressure in the injection gun 202 to allow removal of the first output coupling 116 without blow-back.

The pressure release valve assembly 114 of the injection gun 202 may include the flow control valve 138 connected to the third port 128 of the four-way valve 110. The collection tube 140 may be connected to the flow control valve 138. The collection tube 140 may have a predefined volume to catch the filler material 106 when the flow control valve 138 is opened to reduce the level of pressure of the filler material 106. In some examples, the collection tube 140 may be a rubber blow-out bladder.

In some examples, system 200 may include the water injection assembly 104, which may include the input port 144 to receive the water 146 from the second airless pump 206 and the second output coupling 152 connected to the flow control valve 148. In some examples, the flow control valve 148 may be connected to the input port 144 of the water injection assembly to control the flow of the water 146, such that the water 146 may be ejected through the second output coupling 152 under pressure.

In some examples, the water injection assembly 104 may be mounted to the filler material injection assembly 102. The second output coupling 152 may be positioned together with the first output coupling, such that when the first output coupling 116 is disconnected from the injection port 300, the second output coupling 152 may relatively quickly be connected to the injection port 300. In some examples, the second output coupling 152 may be connected to a certain injection port 300 to inject the water 146 to flush the crack 402, for instance, to prime the crack 402 for the filler material 106. The first output coupling 116 may be connected to the injection port 300 to inject the filler material 106 into the primed crack 402 to create a saturated surface dry (SSD), for instance, for concrete materials. The SSD may be a condition of an aggregate in which the surfaces of the particles are dry, but the inter-particle voids are saturated with water.

In some examples, the water 146 may be injected prior to the filler material 106 to prime the crack 402. The injected filler material 106 may push out any excess water 146 in the crack 402. In some examples, the filler material 106 may be injected prior to the water 146. Alternatively or additionally, the filler material 106 and the water 146 may alternately be injected into various injection ports 300.

Figure 5:
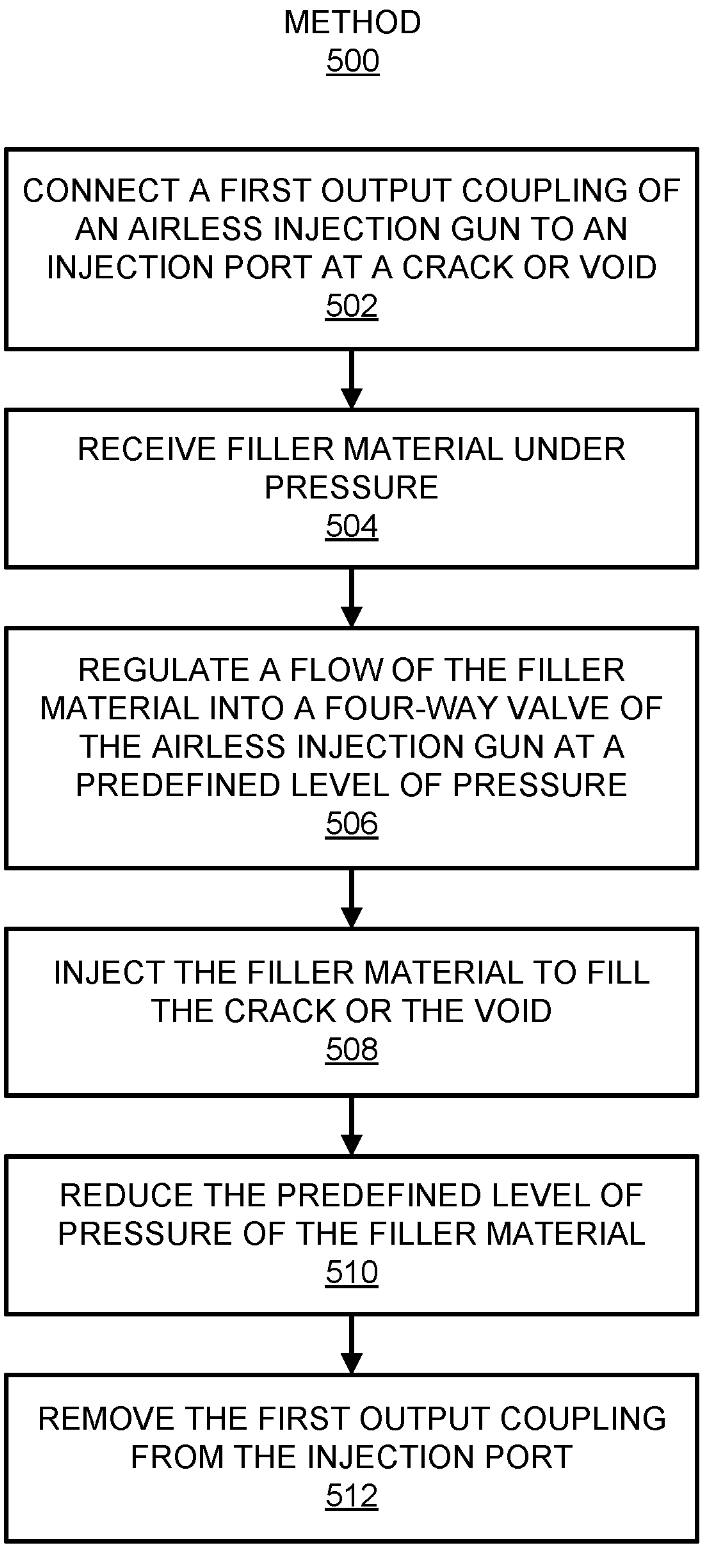
FIG. 5 depicts a flow diagram of an example method for injecting filler material to fill a crack or a void in a solid structure using an airless injection gun, the airless injection gun to regulate a flow of the filler material at a predefined level of pressure and to release the predefined level of pressure of the filler material for removal of the airless injection gun.

Various manners in which the apparatus 100, which may be an airless injection gun, may operate are discussed in greater detail with respect to the method 500 depicted in FIG. 5. FIG. 5 depicts a flow diagram of an example method 500 for injecting filler material 106 to fill a crack or a void 402 in a solid structure 400 using the airless injection gun 100, the airless injection gun 100 to regulate a flow of the filler material 106 at a predefined level of pressure and to release the predefined level of pressure of the filler material 106 for removal of the airless injection gun 100. It should be understood that the method 500 depicted in FIG. 5 may include additional operations and that some of the operations described therein may be removed and/or modified without departing from the scope of the method 500. The description of the method 500 is made with reference to the features depicted in FIGS. 1A to 4B for purposes of illustration.

At block 502, the first output coupling 116 of the airless injection gun 100 may be connected to the injection port 300 disposed at a crack or a void 402 formed in a solid structure 400.

At block 504, the filler material 106 may be received under pressure from a first airless pump 204. The filler material 106 may be received at the pressure regulator handle 108 of the airless injection gun 100 via the first airless pump 204.

At block 506, a flow of the filler material 106 may be regulated, via the pressure regulator handle 108, into the four-way valve 110 of the airless injection gun 100 at a predefined level of pressure. The four-way valve 110 may be connected to a pressure gauge 112 to indicate the predefined level of pressure of the filler material 106.

At block 508, based on the regulated flow of the filler material 106 in the airless injection gun 100, the filler material 106 may be injected, via the first output coupling, to fill the crack 402 formed in the solid structure 400 at a predefined rate.

At block 510, the predefined level of pressure of the filler material 106 may be reduced, via a pressure release valve assembly 114 connected to the four-way valve 110. At block 512, based on a reduction of the predefined level of pressure of the filler material 106, the first output coupling 116 may be removed from the injection port 300.

In some examples, the second output coupling 152 of the airless injection gun 100 may be connected to the injection port 300. The water 146 may be received under pressure, via the second airless pump 206, at the flow control valve 148. The flow control valve 148 may be connected to the second output coupling 152. The flow control valve 148 may be opened to allow the water 146 to flow through the second output coupling 152. The water 146 may be injected, via the second output coupling 152, into the crack 402 formed in the solid structure 400. In some examples, the water 146 may activate the filler material 106. The water 146 may prime the crack 402 and may form an SSD as the filler material 106 is injected through the crack 402.

In some examples, the first output coupling 116 may be routed, via the third tube 142, which may be a flexible tube, connected between the first output coupling 116 and the four-way valve 110. The first output coupling 116 may be routed, at a predefined angle relative to a body of the airless injection gun 100, for instance, around objects or obstacles near the injection port 300.

In some examples, the pressure gauge 112 may measure pressures up to at least 3,000 pounds per square inch (PSI), and the predefined level of pressure at which the filler material 106 is injected may be about 2,500 PSI. In some examples, the pressure gauge 112 may operate at pressures up to at least 5,000 PSI. According to examples, airless injection gun 100 may inject the filler material 106 at a rate of about 120 feet per day.

Although described specifically throughout the entirety of the instant disclosure, representative examples of the present disclosure have utility over a \wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An injection gun comprising:

a filler material injection assembly including:

- a pressure regulator handle to control a flow of filler material;
- a four-way valve connected to the pressure regulator handle, a first port of the four-way valve being connected to the pressure regulator handle to receive the filler material under pressure;
- a pressure gauge connected to a second port of the four-way valve to indicate a level of pressure of the filler material under pressure;

a pressure release valve assembly connected to a third port of the four-way valve, the pressure release valve assembly to reduce the level of pressure of the filler material under pressure; and a first output coupling connected to a fourth port of the four-way valve to eject the filler material under pressure, wherein the pressure release valve assembly includes:

a second flow control valve connected to the third port of the four-way valve; and a collection tube connected to the second flow control valve, wherein the collection tube has a predefined volume to catch and accumulate the filler material therein without releasing the filler material when the second flow control valve is opened to reduce the level of pressure of the filler material.

2. The injection gun of claim 1, further comprising:

a water injection assembly including:

an input port to receive water, the input port to be connected to an airless pump that pumps the water into the input port;

a first flow control valve connected to the input port to control a flow of the water; and a second output coupling connected to the first flow control valve to eject the water.

3. The injection gun of claim 1, wherein the pressure regulator handle includes:

a regulator valve; and a lever coupled to the regulator valve to control the flow of the filler material through the filler material injection assembly.

4. The injection gun of claim 1, further comprising:

a first tube connected to the pressure regulator handle;

a first coupling connected to the first tube, wherein the first coupling has a predefined size relative to a size of the first tube based on a predefined difference in the level of pressure between the first tube and the first coupling; and a second tube connected between the first coupling and the first port of the four-way valve.

5. The injection gun of claim 1, further comprising:

a third tube connected between the fourth port of the four-way valve and the first output coupling, wherein the third tube is formed of a flexible material and has a predefined length.

6. The injection gun of claim 5, wherein the third tube is formed of a rubber, a plastic, or a combination thereof.

7. The injection gun of claim 1, wherein the pressure gauge is to measure pressures up to at least 3,000 pounds per square inch (PSI), and wherein an operating pressure of the filler material in the filler material injection assembly is about 2,500 PSI.

8. The injection gun of claim 1, wherein the filler material is a hydrophobic polyurethane material having a predefined viscosity.

9. An airless injection gun system comprising:

an injection gun including:

a filler material injection assembly including a pressure regulator handle to control a flow of filler material, a pressure gauge to indicate a level of pressure of the filler material, and a pressure release valve assembly to reduce the level of pressure of the filler material; and a water injection assembly including a first flow control valve to control a flow of water;

a first airless pump connected to the pressure regulator handle of the filler material injection assembly to supply the filler material to the filler material injection assembly; and a second airless pump connected to the water injection assembly to supply the water through the water injection assembly.

10. The airless injection gun system of claim 9, wherein the filler material injection assembly comprises:

a four-way valve connected to the pressure regulator handle, wherein a first port of the four-way valve is connected to the pressure regulator handle to receive the filler material under pressure, a second port of the four-way valve is connected to the pressure gauge;

a third port of the four-way valve is connected to the pressure release valve assembly; and a fourth port of the four-way valve is connected to a first output coupling, wherein the filler material under pressure is to be ejected through the first output coupling.

11. The airless injection gun system of claim 10, wherein the filler material injection assembly comprises:

a first tube connected to the pressure regulator handle;

a first coupling connected to the first tube, wherein the first coupling has a predefined size relative to a size of the first tube based on a predefined difference in the level of pressure between the first tube and the first coupling; and a second tube connected between the first coupling and the first port of the four-way valve.

12. The airless injection gun system of claim 10, wherein the filler material injection assembly comprises:

a third tube connected between the fourth port of the four-way valve and the first output coupling, wherein the third tube is formed of a flexible material and has a predefined length.

13. The airless injection gun system of claim 10, wherein the pressure release valve assembly comprises:

a second flow control valve connected to the third port of the four-way valve; and a collection tube connected to the second flow control valve, wherein the collection tube has a predefined volume to catch the filler material when the second flow control valve is opened to reduce the level of pressure of the filler material.

14. The airless injection gun system of claim 9, wherein the water injection assembly comprises:

an input port to receive the water from the second airless pump, wherein the first flow control valve is connected to the input port to control the flow of the water; and a second output coupling connected to the first flow control valve, wherein the water is to be ejected through the second output coupling.

* * * * *